United States Patent [19]

Hackney et al.

[11] 4,195,192
[45] Mar. 25, 1980

[54] SAFETY DISCONNECT SWITCH FOR SUSPENDED CABLES

[75] Inventors: James W. Hackney, New Albany; Edwin E. Glasscock, Clarksville, both of Ind.

[73] Assignee: Hackney-Glasscock, Inc., New Albany, Ind.

[21] Appl. No.: 947,609

[22] Filed: Oct. 2, 1978

[51] Int. Cl.² .............................................. H02G 7/18
[52] U.S. Cl. .................................. 174/40 R; 200/79; 248/64
[58] Field of Search .................. 174/40 R, 40 TD, 44, 174/45 R, 45 TD; 200/79, DIG. 22; 248/64; 339/46

[56] References Cited

U.S. PATENT DOCUMENTS

| 470,382 | 3/1892 | Kerstein | 174/40 TD X |
| 3,519,727 | 7/1970 | Rasmussen et al. | 174/45 R |
| 3,711,049 | 1/1973 | Grannis | 174/40 R X |
| 3,761,865 | 9/1973 | Bomgaars et al. | 174/40 R X |

*Primary Examiner*—Laramie E. Askin
*Attorney, Agent, or Firm*—Richard L. Caslin

[57] ABSTRACT

A safety disconnect switch for mounting on a utility pole to serve as an anchor at one end of a suspended service entrance cable extending to a remote building, so as to first disconnect the cable and then drop it harmlessly to the ground upon an excessive tension force being applied to the cable by a falling tree or the like. This device includes a movable terminal clamping means or slider that joins the termial ends of the wires of the suspended cable to the bus bars of the incoming power supply lead wires. A detent switch mechanism or means holds the movable terminal clamping means in either a first fixed position or a second cable-released position. The detent switch means also includes a locking means and a trigger means to open the locking means upon a predetermined tension force being exerted on the suspended cable.

18 Claims, 5 Drawing Figures

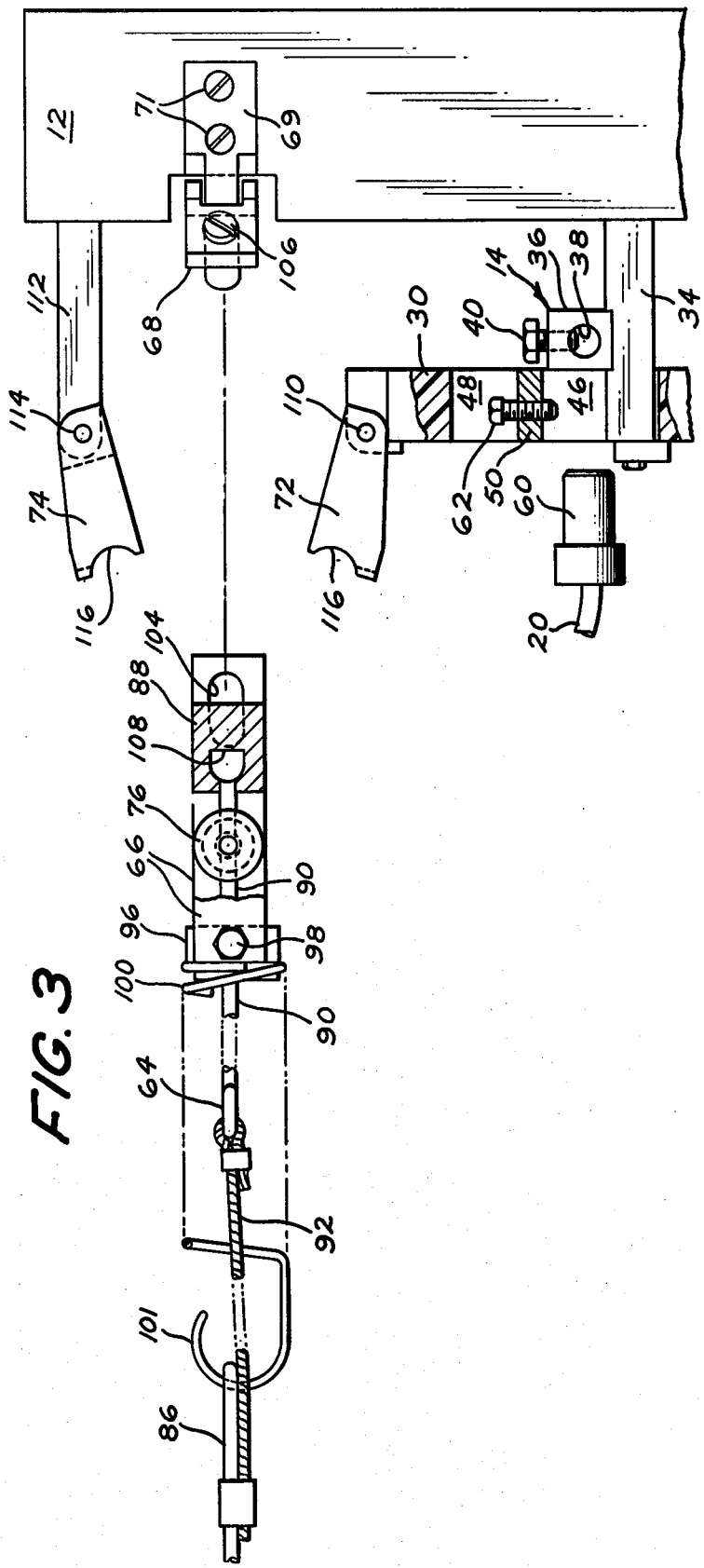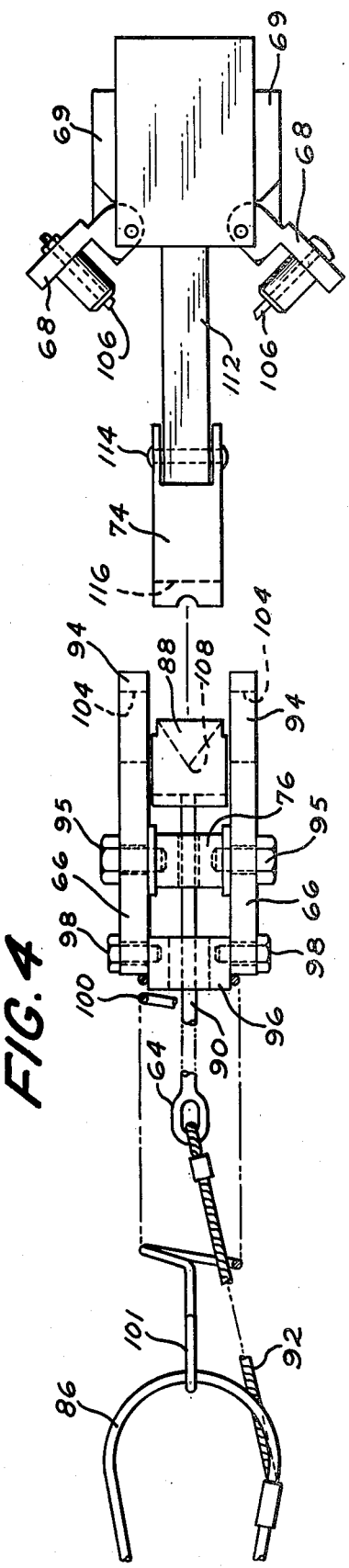

SAFETY DISCONNECT SWITCH FOR SUSPENDED CABLES

BACKGROUND OF THE INVENTION

1. Field of the Invention

This invention relates to a safety disconnect switch for serving as an anchor means of suspended electrical cables which will first disconnect the cable and then drop it harmlessly to the ground whenever an excessive tension force is exerted on the cable by a falling tree or the like.

2. Description of the Prior Art

Safety release mechanisms are widely used with overhead powerlines as is shown in the Rasmussen et al U.S. Pat. No. 3,519,727. In this patent, each safety release mechanism supports a single overhead powerline under normal conditions, and releases the line under abnormal longitudinal loads which might otherwise cause damage to the suspension towers. The release mechanism comprises a slide and a slide support. The slide support is pivotally attached to the suspension tower and the slide is pivotally attached to a transmission line. The slide is held against vertical and transverse forces by the support, and against longitudinal by a shear pin connecting the slide to the slide support so that when excessive longitudinal forces occur, the shear pin will break and the slide will become disengaged from the slide thereby disengaging the transmission line from the tower. When the transmission line is separated from the suspension tower, the line remains intact and continues to carry electrical current.

Another patent of this sort is the Grannis Pat. No. 3,711,049 which describes a mechanical load limiter for overhead powerlines for releasing a powerline from its suspension tower whenever an excessive mechanical load is put on a powerline so as to protect the tower from damage or destruction. This Grannis load limiter is fixed at one end to a powerline suspension tower, or pole arm, and at the other to an insulator attached to a powerline. Movement of the line beyond a predetermined limit in either direction causes the limiter to release the insulator, thereby dropping the single line and preventing damage to the tower.

A safety breakaway connector for use with multi-conductor service entrance cable is shown in the Bomgaars et al U.S. Pat. No. 3,761,865. This breakaway connector is attached to a utility pole to release the service entrance cable upon excessive pull on the cable, caused by falling limbs, high wind, ice accumulation, accident or the like. A push-pull disconnect is provided in each conductor of the service entrance cable adjacent the pole so that the wires will be disconnected automatically when the cable is released. The breakaway connector includes a pivotal detent bar which is longitudinally shiftable toward the cable against the bias of a heavy compression spring. The service entrance cable is connected to the detent bar by a ring looped around the bar. Cable tension on the ring tends to both rotate and longitudinally shift the bar. Under normal cable load conditions, the bar engages stop means to prevent its rotation. Excessive pull on the cable longitudinally shifts the bar away from the stop means to allow its rotation, which in turn releases the ring and cable from the detent bar.

OBJECTS OF THE PRESENT INVENTION

The principal object of the present invention is to provide a safety disconnect switch for a suspended electrical cable that serves as an anchor means for the wires of the cable, and provides a tight clamping action for the terminal ends of the several wires of the cable to withstand all normal operating conditions of the cable.

A further object of the present invention is to provide a safety disconnect switch of the class described with a detent switch mechanism for automatically releasing all of the terminal ends of the several wires of the cable simultaneously for first deenergizing the cable and then dropping it harmlessly to the ground whenever an excessive tension force is exerted on the suspended cable.

A further object of the present invention is to provide a safety disconnect switch of the class described with a detent switch mechanism having locking means to withstand a given amount of tension on the suspended cable, and with trigger means for quick-opening of the detent switch mechanism for releasing the cable.

A further object of the present invention is to provide a safety disconnect switch of the class described with a detent switch mechanism having a resilient wire anchoring means that is locked to withstand a given tension force on the cable, and a weakened shear means of predetermined strength that is acted upon when the tension force exceeds a given amount.

SUMMARY OF THE INVENTION

The present invention provides a safety disconnect switch for use with a suspended electrical cable that extends between anchors, usually one at a utility pole and the other at a building being served with electrical power. In the event of an excessive tension force being exerted upon the cable, the disconnect switch first deenergizes the cable and then drops it harmlessly to the ground. This disconnect switch is preferably mounted on the utility pole, and it includes bus bars for receiving the incoming power supply lead wires. A movable terminal clamping means or slider constituting a quick-release connector means joins the terminal ends of the several wires of the cable to the bus bars. A detent switch mechanism or means cooperates with the movable slider for holding the slider in a first fixed position and for releasing the slider to assume a cable-released position. A wire anchoring means joins a given wire of the cable to the detent switch means at a point remote from the terminal end of that wire. The detent switch means is triggered to release the movable slider when an excessive tension force is applied to the cable.

BRIEF DESCRIPTION OF THE DRAWINGS

This invention will be better understood from the following description taken in conjunction with the accompanying drawings and its scope will be pointed out in the appended claims.

FIG. 3 is a fragmentary right side elevational view on an enlarged scale of the top portion of the device of FIG. 1, with the detent switch mechanism shown in its open position shortly after the triggering mechanism has been actuated by an excessive tension force exerted on the cable.

FIG. 4 is a top plan view on an enlarged scale of the detent switch mechanism of FIG. 3.

DESCRIPTION OF THE PREFERRED EMBODIMENTS

Figure 1:
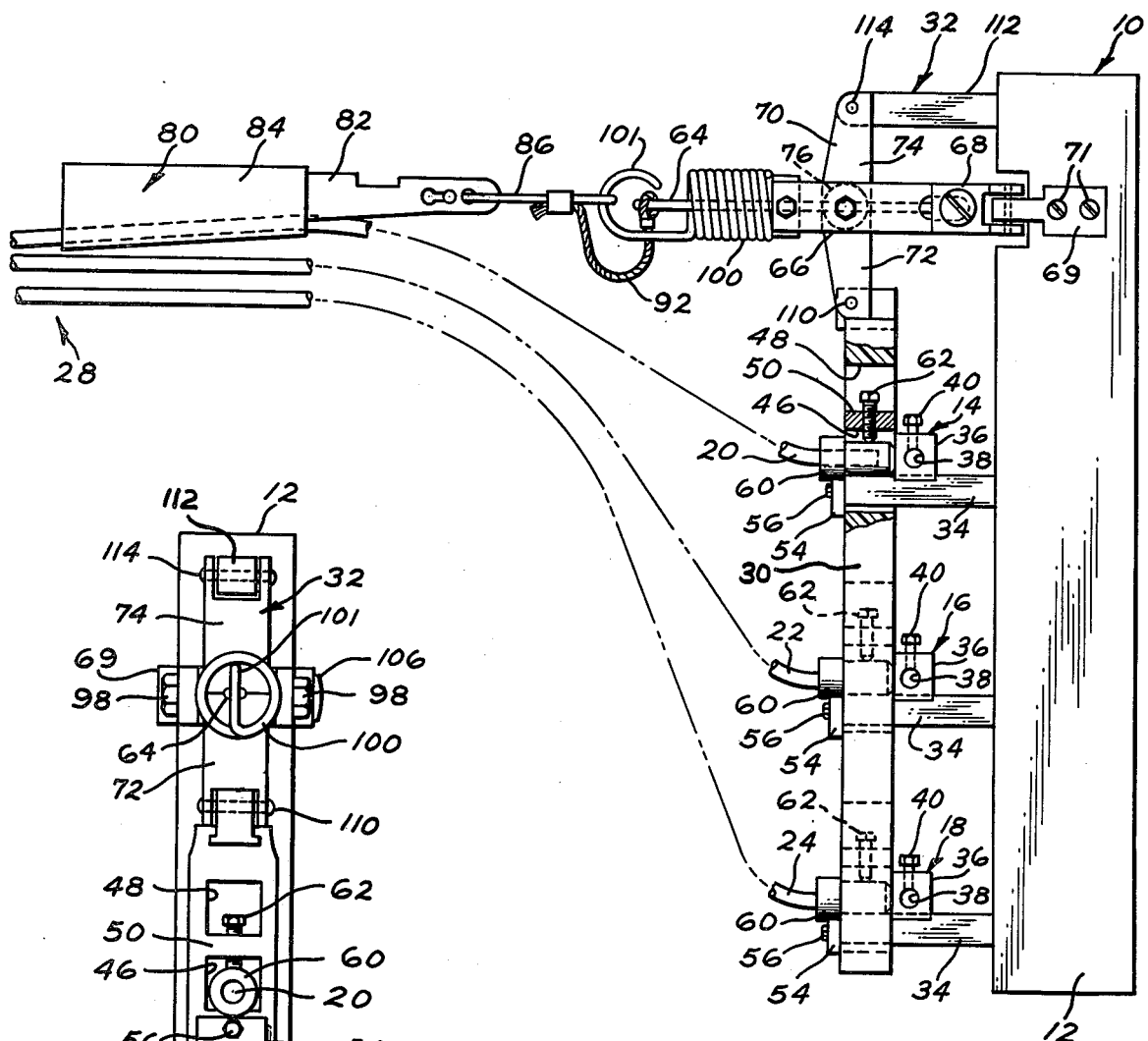
FIG. 1 is a right side elevational view of a safety disconnect switch according to the present invention as it would be mounted on a utility pole. The three bus bars are vertically spaced at the lower portion of the device. A movable terminal clamping slider or quick-release connector means encompasses the three bus bars. The detent switch mechanism is arranged at the top of the device and controls the position of the slider.

Turning now to a consideration of the drawings and, in particular, to the right side elevational view of FIG. 1, there is shown the safety disconnect switch 10 of the present invention. This disconnect switch 10 comprises: first, a vertical mounting base or base means 12; second, a series of three bus bars or bus bar means 14, 16 and 18 for making electrical connections between the three power supply wires from a transformer (not shown) and the three wires 20, 22, 24 of a service entrance cable 28; third, a movable terminal clamping means or slider 30 constituting a quick-release connector means for fastening the three wires to the three bus bars; and fourth, a detent switch mechanism or means 32 for controlling the position of the slider.

The service entrance cable 28 usually is provided with a bare, neutral or ground wire 20 and a pair of insulated, lead wires 22 and 24 which are loosely spiralled around the taut ground wire 20. The ground wire is taut between supports because it is anchored at one end to the utility pole and at the other end to the building being serviced with electricity. These wires are generally aluminum wires as used today.

The vertical mounting base 12 is preferably made of a molded plastic or ceramic insulating material of high electrical resistivity, high mechanical strength, as well as being all-weather resistant. This base member 12 would be bolted directly to the utility pole (not shown), near the top thereof, by means (not shown) such as lag screws or mounting straps, or the like.

Each bus bar 14, 16 and 18 includes a metal support beam 34 and a hollow, metal connector block 36. This block 36 has a through opening 38 for receiving a bare terminal end of a power supply lead wire (not shown) coming from the transformer (not shown) on the utility pole. Each block 36 also includes a set screw 40 in the top thereof for engagement with the lead wire in the opening 38 for clamping the lead wire in place.

Figure 2:
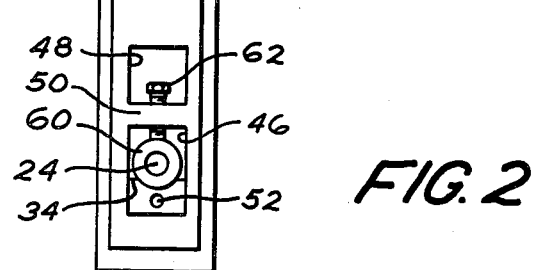
FIG. 2 is a fragmentary front view on an enlarged scale of the device showing the movable terminal clamping slider encompassing the three bus bars, where the slider is furnished with adjustable fastening means for electrically connecting the terminal ends of the several wires to the bus bars.

A vertical, elongated slider or slidebar 30 is supported on the three bus bars 14, 16 and 18 to serve as a movable terminal clamping means or quick-release connector means for the three wires 20, 22 and 24 of the service entrance cable 28 to the three bus bars 14, 16 and 18, respectively. This slider or slidebar 30 is preferably made of a molded, plastic or ceramic insulating material, and it has a ladder-like configuration. For each bus bar, the slider 30 has a pair of sockets 46 and 48. A metal divider or partition 50 separates the two sockets. The free end of the support beam 34 is positioned flush within the socket 46, as is seen at the bottom of FIG. 2 for the bus bar 18. A threaded hole 52 is formed in the end of each support beam. An end plate 54 is fastened to each support beam 34 by means of screw 56 that is threaded into hole 52. Thus, the slider 30 is confined between the three blocks 36 at the back and the three end plates 54 at the front, so the slider is only capable of limited vertical movement relative to the three horizontal, vertically spaced support beams 34.

Each wire 20, 22 and 24 is fitted with a terminal lug 60 on its free end which slips loosely into the socket 46. The ground wire 20 joins with the bus bar 14, the line wire 22 joins with the bus bar 16, and the line wire 24 joins with the bus bar 18. Each divider 50 between socket 46 and socket 48 contains an adjusting screw 62 which can be tightened against the side of the nearest terminal lug 60 in the socket 46. This tightening action should not take place, however, until the movable slider 30 is braced into a fixed position by the detent switch mechanism 32, as will now be explained.

The detent switch mechanism 32 comprises: first, a resilient wire anchoring means 64; second, a U-shaped yoke 66 carried by the anchoring means 64; third, a pair of pivoted locking or latch members 68 for engaging the yoke member; fourth, a toggle joint 70 having a pair of pivoted levers 72 and 74 that cooperate with a cylindrical crossbar 76 of the yoke 66 for bracing against the movable slider 30 in the fixed clamping position, as is shown in FIG. 1. The crossbar 76 is attached between the parallel arms 94 by end bolts 95.

The standard cable clamping member 80 is shown in FIG. 1 joining the ground wire 20 to the wire anchoring means 64. This clamping member 80 has a strap of inverted U-shaped, tapered, transverse cross section; a telescoping sleeve 84 of similar inverted U-shaped, tapered, transverse cross section. The ground wire 20 is first placed into the bottom of the sleeve 84, then the sleeve is slid onto the strap 82 from the smallest end, at the right side of FIG. 1, and slid toward the left until it is wedged tight. A releasible wire loop 86 joins the strap 82 to the wire anchoring means 64. Notice that only the ground wire 20 is attached to the strap 82. The two line wires 22 and 24 trail off the ground wire before reaching the strap, and are connected to the bus bars 16 and 18 respectively.

The wire anchoring means 64 has a shear bar 88 and an elongated stem 90 with a lost-motion loop 92 at the other end, which is attached to the wire loop 86.

The U-shaped yoke 66 has a pair of parallel arms 94 that are joined together by an intermediate ring member 96 that is attached by a pair of pivot bolts 98. The stem 90 of the wire anchoring means extends out through the ring member 96. A heavy duty tension spring 100 is fixed to the ring member 96 at one end, and is attached to the wire loop 86 at the other end 101. The lost-motion loop 92 is joined between the stem 90 and the wire loop 86. As the tension on the ground wire 20 increases, the spring 100 tends to expand by an amount that is limited by the size of the lost-motion loop 92. When the limit of the lost-motion loop 92 is reached, no further relative motion is possible. Any additional tension on the ground wire 20 causes a like amount of movement of the wire anchoring means 64, and particularly the shear bar 88.

Figure 5:
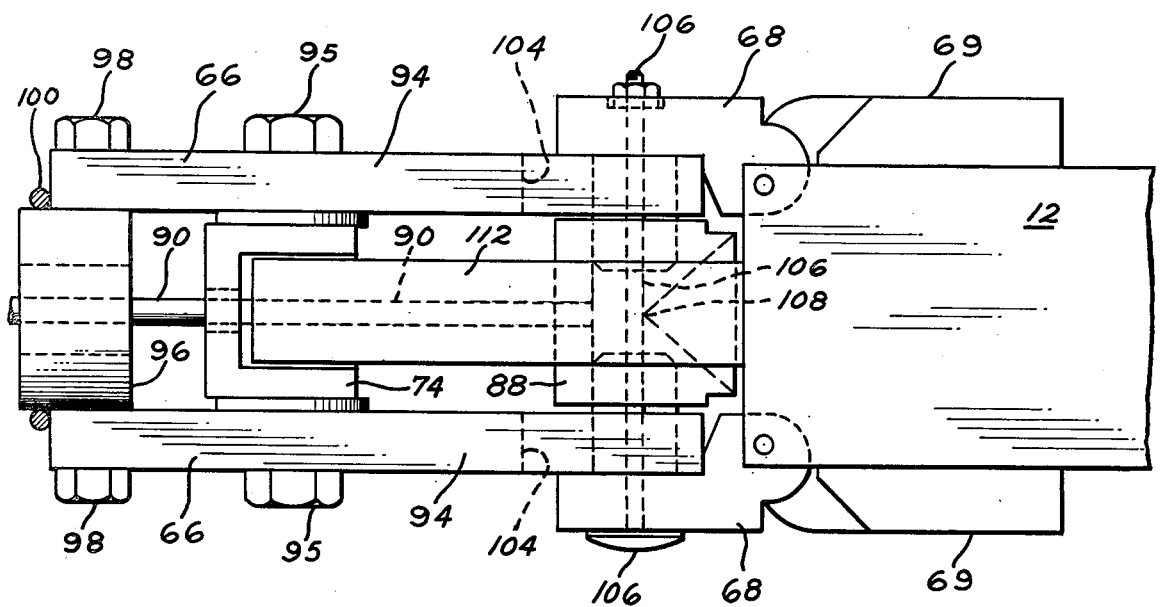
FIG. 5 is a top view on an enlarged scale of the detent switch mechanism of the safety disconnect switch of FIG. 1 showing a shear pin holding the pivoted latch members in place to withstand a predetermined tension force exerted on the cable.

Each arm 94 of the U-shaped yoke 66 is provided with an elongated slot 104 for receiving the pivoted locking or latch member 68 therein, as is best seen in FIG. 5. Each locking member has a strap 69 that is attached to the base 12 by fastening screws 71. Each locking member 68 is hollow for receiving a shear pin or force limit means 106 therethrough, as a latching means. The shear bar 88 at the end of the elongated stem 90 is also hollow for receiving a portion of the ends of the locking members 68 therein. Inside the hollow shear bar 88 is a transverse cutting edge 108 which underlies the pin 106 and is adapted to shear the pin 106 if and when the tension force on the ground wire 20 becomes excessive. The pivoted locking members 68 are designed to withstand a certain tension force on the cable when they are engaged in the slots 104. In addition, the strength of the shear pin or force limit means 106 is calibrated to withstand a given tension force on the cable as best determined by engineering tests under actual operating conditions.

The toggle joint 70 serves as a bracing means to set up a brace against the movable slider 30 when in the fixed clamping position, as is best shown in FIG. 1. The toggle joint 70 comprises a pair of pivoted levers 72 and 74. The lever 72 is pivoted to the nearest end of the slider, as at 110. The outer lever 74 is supported from a support beam 112, by means of pivot 114. The free end of each lever is formed with a concave surface 116 for receiving half of the cylindrical crossbar 76 therein. When the levers 72 and 74 are in the straight line position of FIG. 1, the center axis of the crossbar lies substantially in the same plane as the two pivots 110 and 114. Once an excessive strain is put on the cable 28, the cutting edge 108 shears the pin 106, the locking members 68 will spring outwardly to release their grip on the yoke 66, as is seen in FIG. 4. When this happens, the wire anchoring means 64 and the yoke 66 are yanked away from the vertical mounting base 12. Simultaneously, the toggle joint 70 buckles as the crossbar 76 slips out from between the two pivoted levers 72 and 74, as is best seen in FIG. 3. When the toggle joint buckles, it no longer serves as a brace against the movable terminal clamping slider 30. Hence, as the service entrance cable 28 becomes unattached to the base 12, increased tension is put on the line wires 22 and 24, as well as the ground wire 20 at the bus bars. Thus, the three terminal lugs 60 are unclamped and released by the withdrawal of the downward pressure of the toggle joint 70 onto the slider 30.

Having described above a preferred embodiment of a safety disconnect switch for suspended cables, it will be readily apparent to those skilled in this art that modifications may be made in some of the elements without departing from the scope of the present invention. The movable terminal clamping slider could be split to have at least one of the terminal lugs clamped to a bus bar at either side of the detent switch mechanism 32. Then each pivoted lever 72 and 74 would be pivoted to a separate slider 30. Otherwise, the invention would be the same as in the illustrated embodiment. Another modification would be to use this safety disconnect switch for a single wire rather than a plurality of wires. Moreover, it should be understood that this safety disconnect switch 10 would be furnished with an overall cover (not shown) supported from the base 12 to shield all of the moving parts from the ravages of cold and rainy weather. The use of this cover would be particularly advantageous during ice storms to avoid freezing the mechanism which might otherwise render the switch inoperative.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A safety disconnect switch for use with a suspended electrical cable extending between anchors and comprising:
   a. a base means serving as the anchor at one end of the cable span;
   b. bus bar means on the base means for receiving incoming power supply lead wires;
   c. movable terminal clamping means for joining the terminal ends of the wires of a suspended electrical cable to the bus bar means;
   d. detent switch means for holding the movable terminal clamping means in a first fixed position and for releasing the movable terminal clamping means into a second cable-released position;
   e. said detent switch means including a wire anchoring means for attachment to a given wire of the electrical cable at a point remote from the terminal end of that wire;
   f. said detent switch means being triggered to release the movable terminal clamping means whenever a tension force above a predetermined amount is applied to the said given wire;

2. The invention as recited in claim 1 wherein the said movable terminal clamping means includes adjustable fastening means for engaging each terminal end of the wires of the suspended cable.

3. The invention as recited in claim 2 wherein the said detent switch means includes a bracing means connected between the wire anchoring means and the movable terminal clamping means for governing the position of the movable terminal clamping means.

4. The invention as recited in claim 3 wherein the said detent switch means includes a releasable locking means for holding the wire anchoring means to the base means.

5. The invention as recited in claim 4 wherein the said releasable locking means comprises a pair of pivoted latch members that are supported from the base means and couple with the wire anchoring means.

6. The invention as recited in claim 5 wherein the said releasable locking means includes a force limit means that cooperates with the releasable locking means to set the detent switch means to trigger at a preselected tension force being exerted on the given wire of the suspended cable.

7. The invention as recited in claim 6 wherein the said force limit means is a shear pin that extends through the pivoted latch members when in the coupled position and is acted upon by a shear bar that is carried by the wire anchoring means.

8. A safety disconnect switch for use with a suspended electrical cable extending between anchors and comprising:
   a. a base means serving as the anchor at one end of the cable span;
   b. bus bar means on the base means for connecting incoming power supply lead wires;
   c. movable terminal clamping means for joining the terminal ends of the wires of a suspended electrical cable to the bus bar means;
   d. detent switch means for holding the movable terminal clamping means in a first fixed position and for releasing the movable terminal clamping means into a second cable-released position;

e. said detent switch means comprising a first resilient wire anchoring means for attachment to a given wire of the electrical cable at a point remote from the terminal end of that wire, a second bracing means connected between the resilient wire anchoring means and the movable terminal clamping means for governing the position of the movable terminal clamping means, and a third releasable locking means for holding the resilient wire anchoring means to the base means; and, f. trigger means for opening the releasable locking means of the detent switch means upon a predetermined tension force being applied to the said given wire of the cable.

9. The invention of claim 8 wherein the said bracing means is a toggle joint means which is extended to hold the movable terminal clamping means in its first fixed position when the releasable locking means holds the resilient wire anchoring means to the base means, the toggle joint means collapsing into its released position when the resilient wire anchoring means is unlocked and separated from the base means.

10. The invention of claim 8 wherein the said releasable locking means comprises a pair of pivoted latch members that are supported from the base means and couple with the resilient wire anchoring means.

11. The invention of claim 10 wherein the said trigger means comprises a force limit means that cooperates with the releasable locking means in a locking relationship.

12. The invention of claim 11 wherein the said force limit means is a shear pin that is acted upon by a shear bar that is carried by the resilient wire anchoring means.

13. The invention as recited in claim 8 wherein the said movable terminal clamping means includes adjustable fastening means for engaging each terminal end of the wires of the cable.

14. A safety disconnect switch for use with a suspended electrical cable extending between anchors and comprising:
   a. a base means serving as an anchor at one end of the cable span;
   b. quick-release connector means for joining incoming power supply lead wires to the terminal ends of the wires of a suspended electrical cable;
   c. detent switch means comprising a first resilient wire anchoring means for attachment to a given wire of the electrical cable at a point remote from the terminal end of that wire, a second releasable locking means for holding the resilient wire anchoring means to the base means, and trigger means for opening the releasable locking means upon a predetermined tension force being exerted on the given wire of the cable.

15. The invention as recited in claim 14 wherein the said quick-release connector means comprises a slidebar for clamping the terminal ends of the wires of the cable, and the detent switch means holds the slidebar in either a first fixed position or releases the slidebar to shift to a second cable-released position.

16. The invention as recited in claim 15 wherein the detent switch means includes a collapsible bracing means connected between the resilient wire anchoring means and the slidebar for governing the position of the slidebar.

17. The invention as recited in claim 16 wherein the said collapsible bracing means is a toggle joint means which is extended to hold the slidebar in its first fixed position when the releasable locking means holds the resilient wire anchoring means to the base means, the toggle joint means collapsing into its released position when the resilient wire anchoring means is unlocked and separated from the base means.

18. A safety disconnect switch for use with a suspended electrical wire extending between anchors and comprising:
   a. a base means serving as the anchor at one end of the wire span;
   b. bus bar means on the base means for receiving an incoming power supply lead wire;
   c. movable terminal clamping means for joining the terminal end of the suspended wire to the bus bar means;
   d. detent switch means for holding the movable terminal clamping means in a first fixed position and for releasing the movable terminal clamping means into a second wire-released position;
   e. said detent switch means including a wire anchoring means for attachment to the suspended wire at a point remote from the terminal end of that wire;
   f. said detent switch means being triggered to release the movable terminal clamping means whenever a tension force above a predetermined amount is applied to the suspended wire.

* * * * *